Dec. 31, 1957 H. J. C. NIEUWENHOVEN 2,817,998
MOUNTING OF MIRRORS AND MENISCUS-SHAPED
LENSES IN MIRROR CAMERAS
Filed June 12, 1956

INVENTOR.
Hendricus J. C. Nieuwenhoven
BY
Wenderoth, Lind & Ponack
ATTYS.

United States Patent Office 2,817,998
Patented Dec. 31, 1957

2,817,998

MOUNTING OF MIRRORS AND MENISCUS-SHAPED LENSES IN MIRROR CAMERAS

Hendricus Jacobus Cornelis Nieuwenhoven, Rijswijk, Netherlands, assignor to N. V. Optische Industrie "De Oude Delft," Delft, Netherlands Application June 12, 1956, Serial No. 590,968

Claims priority, application Netherlands June 20, 1955

5 Claims. (Cl. 88—57)

The invention refers to mirror cameras, in which the objective is formed by a concave mirror to which one or more correcting elements are added. Well-known examples of objectives of this type are those of the Schmidt and Bouwers systems respectively. Particulars of the latter system are to be found, for instance, in the British Patents 638,975 and 637,645 and United States Patent 2,492,461.

In mirror systems of this type the concave mirror surface is made with the utmost precision in view of the very high image quality that is required. A very slight deformation of the mirror results in a marked detriment to image quality. Such deformation may be caused at the time of installation or later on during operation or transport and is due to mechanical forces of a permanent or temporary nature acting upon the mirror. Deformation of the mirror may also be caused by the weight of the mirror itself, which, especially with the larger types of cameras, is found to be a particularly serious problem.

The invention refers to a system of mirror mounting whereby deformation due to mounting is largely or entirely prevented by reason of the fact that in this construction the points of pressure at the front and rear of the mirror are in alignment, the line connecting said points of pressure being directed (or approximately directed) towards the centre of curvature of the mirror. In this way the advantage is achieved that only very slight, if any, moments of force act upon the body of the mirror, so that no deformation can be produced.

An advantageous embodiment of this invention is obtained when the points of pressure on one or on both sides of the optical element are formed by sphere segments whose surface of contact with the optical element has the same radius of curvature as the optical element itself. A sphere segment of this kind is selfcentring, thus avoiding the occurrence of forces at a point and couples of forces.

The mounting may be realized constructionally in different ways. One embodiment is that in which there are holes drilled in the optical element in such a manner that the axis of the holes is directed (or approximately directed) towards the centre of curvature of the mirror. This embodiment offers the advantage of simplicity of the mechanical construction and is preferably employed for concave mirrors.

According to another embodiment the fixing elements grip around the edge of the optical element, thus obviating the necessity of drilling holes in the optical element. This is an advantage, as the drilling of these holes is a delicate operation. This advantage is particularly evident in mounting meniscus-shaped lenses.

The fixing points should preferably be situated on the circumference of a circle and at equal distances from each other. These fixing points should preferably be three in number in order to avoid statically undefined contructions, whilst symmetrical positioning of the fixing points ensures the most uniform possible distribution of force.

It is recommended, according to the invention, that the rear face of the concave mirror be curved in the same direction as the front face, the curvature being preferably made such that the two surfaces are perfectly (or substantially) concentric. In this way the formation of a couple of forces that would cause deformation is avoided.

In order to prevent damage being caused to the mirror by accidental shocks or by pronounced variations in temperature, it has been found advantageous to effect the mounting of the mirror by means of springs. In the case of a meniscus lens, however, which is generally smaller in size and lighter in weight than the mirror and is better positioned in the camera housing from the point of view of protection against shocks, the application of springs is not always a necessity.

If the diameter of the bolt holes in the optical element is equal (or substantially equal) to that of the bolts, the rotation of the element about its centre of curvature is avoided. It is, however, still better to make the diameter of the bolt holes greater than that of the bolts and partly or entirely to fill up the residual space, e. g. with a bush of flexible material slipped over the bolt. This prevents stresses being set up in the optical element when the nuts are tightened.

For the elucidation of the foregoing, two embodiments of a method of mounting according to the invention will now be described on the basis of the accompanying drawing. One embodiment refers to a method of mounting a concave mirror, the other to the mounting of a meniscus lens. However, the method of mounting as designed for the mirror may obviously, according to circumstances, be applicable to the meniscus lens as well, and vice versa.

Figure 1:
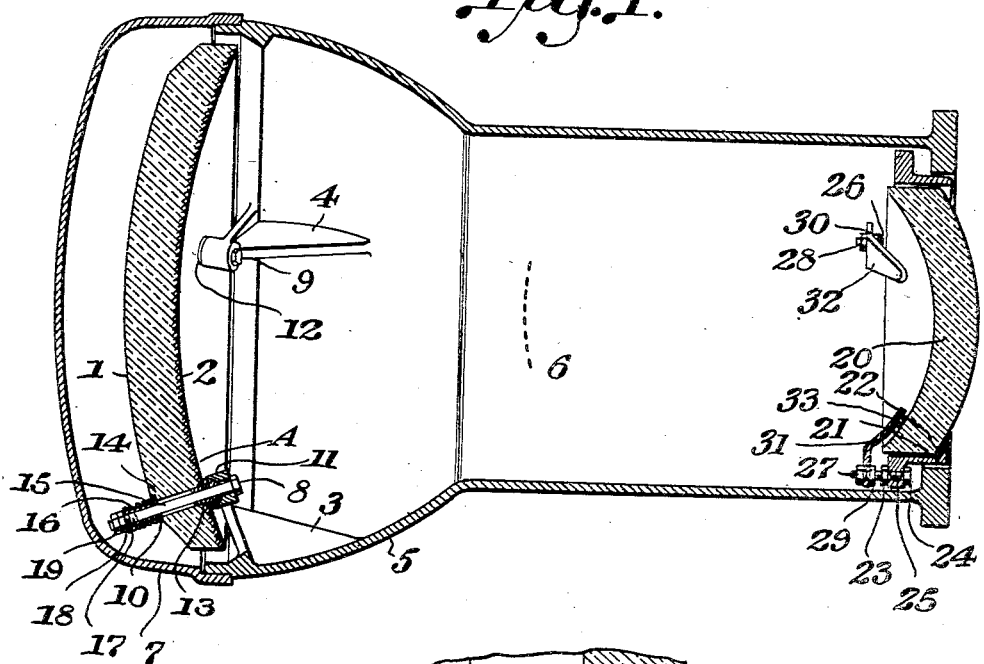
Figure 1 is a cross-sectional view of a mirror camera.
Figure 2:
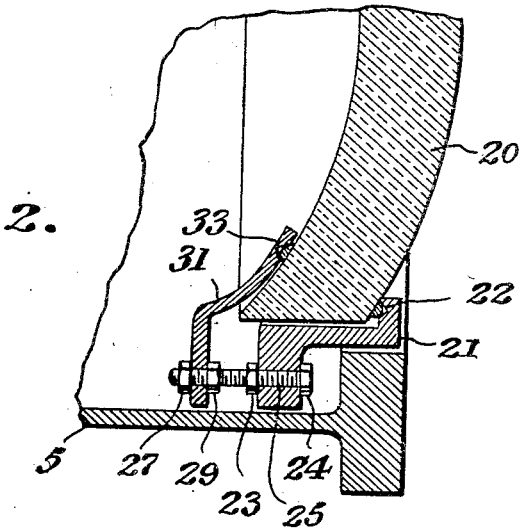
Figure 2 is an enlarged cross-sectional view of the lower right hand side of Figure 1.

The drawing represents a section of a mirror camera. In the housing 5 a concave mirror 1 and a meniscus lens 20 are mounted. The reference numerals given hereinafter in parentheses denote the corresponding components shown in perspective.

The mirror 1 with the reflecting layer 2 is borne by the support 3, (4), which forms part of the camera housing 5. The camera housing, whose image carrier is indicated by the dotted line 6, is closed by the hood 7. The fixing bolt 8, (9) passes through hole 10 in the mirror and through a hole in the support.

The axis of the holes is directed towards the centre of curvature of a mirror. Between the mirror and the support is the sphere segment 11, (12), resting in the conical portion of the hole in the support. The plane AB of the sphere segment has practically the same curvature as the mirror surface 2. The portion of the bolt that is inserted in the hole in the mirror is partly surrounded by the bush 13. The portion of the bolt that projects beyond the rear wall of the mirror is surrounded in succession by the lock ring 14, the bush 15, the spring 16 and the lock ring 17, after which the complete assembly is locked by means of the nut 18, which is secured by the nut 19. The meniscus lens 20 is placed in the ring 21, which is joined to the camera housing by the usual means. The lens rests on the sphere segment 22, which is positioned in a conical recess in the ring. The bolt 25, (26) is fixed in the ring by means of the nuts 23 and 24. The fixing piece 31, (32) is fixed to the bolt 25, (26) by means of the nuts 27, (28) and 29, (30). Between the fixing piece and the lens is the sphere segment 33, which is positioned in a conical hole in the fixing piece.

The devices described above for the mounting of a mirror and a meniscus lens have the effect that these delicate optical elements when fixed in position are as firm as a rock, while on the other hand no forces are set up that might cause any irregularity or deformation, so that perfect image quality is ensured. Severe shock tests and experiments at low as well as at high temperatures (—40° C. and +40° C.) have shown that with this type of camera a resolving power of 50 lines per mm. for objects of low contrast is maintained through all these severe tests.

What I claim is:

1. An optical device for mounting menicus shaped optical elements comprising a housing, a meniscus shaped optical element in said housing, supporting means connected to said housing for supporting said optical element in said housing in optical operative alignment, said supporting means having a plurality of recesses symmetrically spaced apart with respect to said optical element and facing a surface of said optical element, a plurality of spherical segments in said recesses having their bases turned towards said surface of said optical element, resilient means operative upon a second surface of said element to hold said bases of said spherical segments and said first named surface of said optical element pressed together, said recesses permitting said spherical segments to be rotated about their centers by eccentric forces exerted by said first named surface of said optical element upon said bases of said spherical segments when said optical element is mounted in said housing whereby said optical element maintains substantially its original alignment.

2. An optical device as set forth in claim 1, wherein said recesses are conical in shape.

3. An optical device as set forth in claim 1 wherein on both sides of said optical element equal numbers of recesses are provided, each recess being positioned opposite a recess facing the other surface of said optical element and the spherical segments in two recesses positioned opposite each other exerting forces directed along one and the same line upon the surfaces of said optical element.

4. An optical device for mounting meniscus shaped optical elements comprising a housing, a meniscus shaped optical element in said housing having a plurality of symmetrically spaced apart apertures extending along lines substantially perpendicular to said optical element, a plurality of supports connected to said housing for supporting said optical element in said housing in optical operative alignment, each of said supports having a recess facing a surface of said optical element and located opposite one of said apertures in said optical element, a plurality of spherical segments in said recesses in said supports having their bases turned towards said surface of said optical element, a plurality of bolts each of them extending through an aperture in said optical element and through an aperture in the corresponding spherical segment, said latter aperture having a diameter exceeding that of said bolt, and a plurality of screw springs arranged on said bolts to hold said bases of said spherical segments and said surface of said optical element pressed together, said recesses permitting said spherical segments to be rotated about their centers by eccentric forces exerted by said surface of said optical element upon said bases of said spherical segments when said optical element is mounted in said housing whereby said optical element maintains substantially its original alignment.

5. An optical device for mounting meniscus shaped optical elements comprising a housing, a meniscus shaped optical element in said housing, a plurality of resilient blades each being connected at one end to said housing for supporting said optical element in said housing in operative optical alignment, the free end of each of said blades extending parallel to a surface of said optical element and having a recess facing said surface, a plurality of spherical segments in said recesses in said blades having their bases pressed against said surface of said optical element by said blades, said recesses permitting said spherical segments to be rotated about their centers by eccentric forces exerted by said surface of said optical element upon said bases of said spherical segments when said optical element is mounted in said housing, means operative upon a second surface of said element to hold said bases of said spherical segments and said first named surface of said optical element pressed together whereby said optical element maintains substantially its original alignment.

References Cited in the file of this patent

UNITED STATES PATENTS

| | | |
|---|---|---|
| 1,391,990 | Atherton | Sept. 27, 1921 |
| 1,394,085 | Halvorson | Oct. 18, 1921 |
| 1,529,292 | Benford | Mar. 10, 1925 |
| 2,128,791 | Benford | Aug. 30, 1938 |
| 2,304,755 | Zworykin | Dec. 8, 1942 |
| 2,409,971 | Bennett | Oct. 22, 1946 |
| 2,430,595 | Young | Nov. 11, 1947 |
| 2,455,476 | Epstein | Dec. 7, 1948 |
| 2,467,185 | Cady | Apr. 12, 1949 |
| 2,531,509 | Grundmann | Nov. 28, 1950 |
| 2,670,656 | Braymer | Mar. 2, 1954 |
| 2,731,893 | Kling et al. | Jan. 24, 1956 |
| 2,760,407 | Bauerfeld | Aug. 28, 1956 |